United States Patent
Kim et al.

(10) Patent No.: US 9,163,768 B2
(45) Date of Patent: Oct. 20, 2015

(54) RETURN FUEL COOLING SYSTEM FOR LPI VEHICLE AND CONTROL METHOD THEREOF

(71) Applicant: Hyundai Motor Company, Seoul (KR)

(72) Inventors: Jae Yeon Kim, Hwaseong-si (KR); Myeong Hwan Kim, Hwaseong-si (KR); Wan Je Cho, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 156 days.

(21) Appl. No.: 13/711,362

(22) Filed: Dec. 11, 2012

(65) Prior Publication Data

US 2014/0109971 A1 Apr. 24, 2014

(30) Foreign Application Priority Data

Oct. 24, 2012 (KR) .................. 10-2012-0118686

(51) Int. Cl.
| | |
|---|---|
| *B60K 15/10* | (2006.01) |
| *F16L 53/00* | (2006.01) |
| *B60H 1/32* | (2006.01) |
| *F02M 21/02* | (2006.01) |

(52) U.S. Cl.
CPC .............. *F16L 53/00* (2013.01); *B60H 1/3202* (2013.01); *F01P 2060/10* (2013.01); *F02M 21/0212* (2013.01); *Y10T 137/0318* (2015.04); *Y10T 137/6416* (2015.04)

(58) Field of Classification Search
CPC .... B60H 1/3202; F16L 53/00; F01P 2060/10; Y10T 137/0318; Y10T 137/6416; F02B 43/00; F02B 2043/103; F02M 21/00; F02M 21/02; F02M 21/0212; F02M 21/0218; F02M 21/0221; F02M 21/023; F02M 21/0287; B60K 2015/03013; B60K 2015/03414
USPC .................. 180/69.5, 69.4, 65.22, 68.1, 68.2; 123/27 GE, 575, 576, 577, 578, 299; 62/48.1, 48.2, 49.1
See application file for complete search history.

(56) References Cited

U.S. PATENT DOCUMENTS

| | | | | |
|---|---|---|---|---|
| 3,710,809 A | * | 1/1973 | Brown et al. | ...................... 137/1 |
| 4,155,337 A | * | 5/1979 | Hensley | ........................ 123/541 |

(Continued)

FOREIGN PATENT DOCUMENTS

| | | |
|---|---|---|
| EP | 0302277 A1 | 9/1992 |
| JP | 06-241134 A | 8/1994 |

(Continued)

*Primary Examiner* — James M Dolak
(74) *Attorney, Agent, or Firm* — Morgan, Lewis & Bockius LLP

(57) ABSTRACT

A return fuel cooling system for LPI vehicle having an engine and a bombe connected to each other through a fuel supply line and a fuel return line in the LPI vehicle using LPG fuel to cool high-temperature LPG fuel returning from the engine to the bombe, may include a heat exchanger mounted on the fuel return line, a bypass line connecting upstream and downstream of the fuel return line, wherein the heat exchanger may be interposed between the upstream and the downstream of the fuel return line to make the LPG fuel returning to the bombe bypass the heat exchanger and supply the LPG fuel to the bombe, and a valve included at a portion in which the fuel return line and the bypass line is connected, and selectively opening or closing the fuel return line connected with the heat exchanger according to a temperature of the bombe.

3 Claims, 2 Drawing Sheets

(56) References Cited

U.S. PATENT DOCUMENTS

| | | | |
|---|---|---|---|
| 4,489,700 A * | 12/1984 | van der Weide | 123/527 |
| 4,790,145 A * | 12/1988 | Thompson et al. | 123/541 |
| 5,540,208 A * | 7/1996 | Kikutani | 123/518 |
| 6,216,675 B1 * | 4/2001 | Bennett | 123/541 |
| 6,250,290 B1 * | 6/2001 | Mullen | 123/541 |
| 6,766,269 B2 * | 7/2004 | Lee | 702/136 |
| 6,848,431 B2 * | 2/2005 | Kim | 123/514 |
| 6,953,029 B2 * | 10/2005 | Uitenbroek | 123/527 |
| 7,373,932 B2 * | 5/2008 | Hayashi et al. | 123/549 |
| 7,377,294 B2 * | 5/2008 | Handa | 141/82 |
| 7,921,662 B2 * | 4/2011 | Kubo et al. | 62/239 |
| 8,196,567 B2 * | 6/2012 | Pursifull et al. | 123/495 |
| 8,831,857 B2 * | 9/2014 | Nolan et al. | 701/103 |
| 8,833,341 B2 * | 9/2014 | Wong et al. | 123/445 |

FOREIGN PATENT DOCUMENTS

| | | |
|---|---|---|
| JP | 2012-122416 A | 6/2012 |
| KR | 10-0559837 B1 | 3/2006 |
| KR | 10-2010-0091507 A | 8/2010 |
| KR | 10-2010-0091577 A | 8/2010 |

* cited by examiner

RETURN FUEL COOLING SYSTEM FOR LPI VEHICLE AND CONTROL METHOD THEREOF

CROSS-REFERENCE TO RELATED APPLICATION

The present application claims priority to Korean Patent Application No. 10-2012-0118686 filed on Oct. 24, 2012, the entire contents of which is incorporated herein for all purposes by this reference.

BACKGROUND OF THE INVENTION

1. Field of the Invention

The present invention relates to a return fuel cooling system for an LPI vehicle and a control method thereof, and more particularly, to a return fuel cooling system for an LPI vehicle for preventing pressure of a bombe from increasing by efficiently cooling LPG fuel returning from an engine and controlling flow of the returning LPG fuel according to an operation state of an air conditioning unit, and a control method thereof.

2. Description of Related Art

In general, a liquefied petroleum injection (LPI) engine means an engine driven by a mono-fuel method in which a fuel pump is installed inside a bombe, LPG fuel is liquefied at a high pressure (5 to 15 bar) by the fuel pump, and liquefied fuel is sprayed for each cylinder by using an injector, contrary to a mechanical LPG fuel method dependent on pressure of a bombe.

Since the LPI engine sprays liquefied fuel, a vaporizer and a mixer which are constituent components of a mixer type of LPG engine are not necessary, and includes a high pressure injector, a fuel pump installed in the bombe, a fuel supply line, an LPI dedicated electronic control unit (ECU), a regulator unit for adjusting fuel pressure, and the like.

The electronic control unit of the LPI engine receives input signals of various sensors to determine a state of the engine, and controls the fuel pump, the injector, and an ignition coil in order to achieve an optimum air-fuel ratio and improve engine performance.

Further, the electronic control unit of the LPI engine controls the fuel pump according to the amount of fuel demanded by the engine to supply liquefied fuel to the engine, and the LPI injector sequentially sprays the fuel for each cylinder to implement an optimum air-fuel ratio.

However, in a vehicle to which the LPI system in the related art is applied, high-temperature return fuel returns to the bombe from the engine, a phenomenon in which internal pressure of the bombe increases according to an increase in a temperature of the LPG fuel. Especially, when the internal pressure of the bombe is higher than charging pressure of a charging station, there is a problem in that the LPG fuel is not charged in the bombe.

Accordingly, it is necessary to install a separate fuel cooling apparatus in order to lower a temperature of the fuel returning from the engine, so that manufacturing and installation costs increase and there is a limit in securing an installation space inside a narrow engine room.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a return fuel cooling system for an LPI vehicle having advantages of preventing internal pressure of a bombe from increasing by including a heat exchanger for heat exchanging coolant circulating an air conditioning unit and an LPG fuel returning from the engine to the bombe to make the LPG fuel flow in the bombe in a state where a temperature of the LPG fuel is decreased, and a control method thereof.

In an aspect of the present invention, a return fuel cooling system for a liquefied petroleum injection (LPI) vehicle having an engine and a bombe connected to each other through a fuel supply line and a fuel return line in the LPI vehicle using LPG fuel to cool high-temperature LPG fuel returning from the engine to the bombe, may include a heat exchanger mounted on the fuel return line and configured to heat exchange coolant supplied thereto and circulating from an air conditioning unit, in which the coolant circulates, and the LPG fuel to cool the LPG fuel, a bypass line connecting upstream and downstream of the fuel return line, wherein the heat exchanger is interposed between the upstream and the downstream of the fuel return line to make the LPG fuel returning to the bombe bypass the heat exchanger and supply the LPG fuel to the bombe, and a valve may include d at a portion in which the fuel return line and the bypass line are connected, and selectively opening or closing the fuel return line connected with the heat exchanger according to a temperature of the bombe to make the LPG fuel flow in the heat exchanger or the LPG fuel flow through the bypass line.

When the temperature of the bombe is lower than a predetermined temperature, the valve is closed to make the LPG fuel returning from the engine detour to the bypass line to make a returning LPG fuel directly flow in the bombe.

The bombe may include a temperature sensor therein, wherein the temperature sensor measures the temperature in the bombe and outputs a detected signal to an electronic control unit (ECU) of the vehicle.

The ECU is connected with a full automatic temperature control (FATC) configured to control the air conditioning unit, and controls an operation of the valve according to the temperature in the bombe and an operation state of the air conditioning unit through signals output from the temperature sensor and the FATC.

In another aspect of the present invention, a method of controlling a return fuel cooling system for a liquefied petroleum injection (LPI) vehicle having an engine and a bombe connected to each other through a fuel supply line and a fuel return line in the LPI vehicle using LPG fuel to cool high-temperature LPG fuel returning from the engine to the bombe, may include (a) detecting a temperature inside the bombe, and making returning LPG fuel bypass or flow in a heat exchanger by selectively opening or closing of a valve disposed on the fuel return line, according to the temperature inside the bombe, (b) detecting whether an air conditioning unit is operated and determining an operation state of the air conditioning unit when the LPG fuel flows in the heat exchanger according to opening of the valve, and (c) controlling the air conditioning unit according to an operation state of the air conditioning unit.

The valve is disposed on the fuel return line at an upstream of the heat exchanger and fluid-connected to a downstream of the heat exchanger.

The step (a) may include detecting the temperature of the bombe through a temperature sensor may include d inside the bombe, determining whether the temperature of the bombe detected through the temperature sensor is equal to or higher than a predetermined temperature, when the temperature of the bombe is lower than the predetermined temperature, closing the valve and making the LPG fuel returning from the engine detour to a bypass line to make the returning LPG fuel directly flow in the bombe, and when it is determined that the temperature of the bombe is equal to or higher than the predetermined temperature, opening the valve, making the LPG fuel flow in the heat exchanger in which coolant supplied from the air conditioning unit flow, and cooling the LPG fuel with the coolant through heat exchange to make the cooled LPG fuel return to the bombe.

The bypass line is connected to the fuel return line at an upstream of the heat exchanger via the valve and fluid-connected to a downstream of the heat exchanger.

The step (c) may include compulsorily driving the air conditioning unit when the air conditioning unit is not operated.

The step (c) may include controlling the air conditioning unit according to a map including at least one of a setting temperature selected by a driver, an exterior temperature, an interior temperature, a coolant temperature, cooling efficiency, and a temperature of the LPG fuel when the air conditioning unit is operated.

Accordingly, the return fuel cooling system for the LPI vehicle and the method of controlling the same according to the exemplary embodiment of the present invention may prevent internal pressure of the bombe from increasing by including the heat exchanger for heat exchanging the coolant circulating the air conditioning unit and the LPG fuel returning to the bombe from the engine to make the LPG fuel flow in the bombe in a state where a temperature of the LPG fuel is lowered.

Further, it is possible to smoothly inject the fuel to the bombe during the charging with the fuel and improve product merchantability by preventing the internal pressure of the bombe from increasing.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
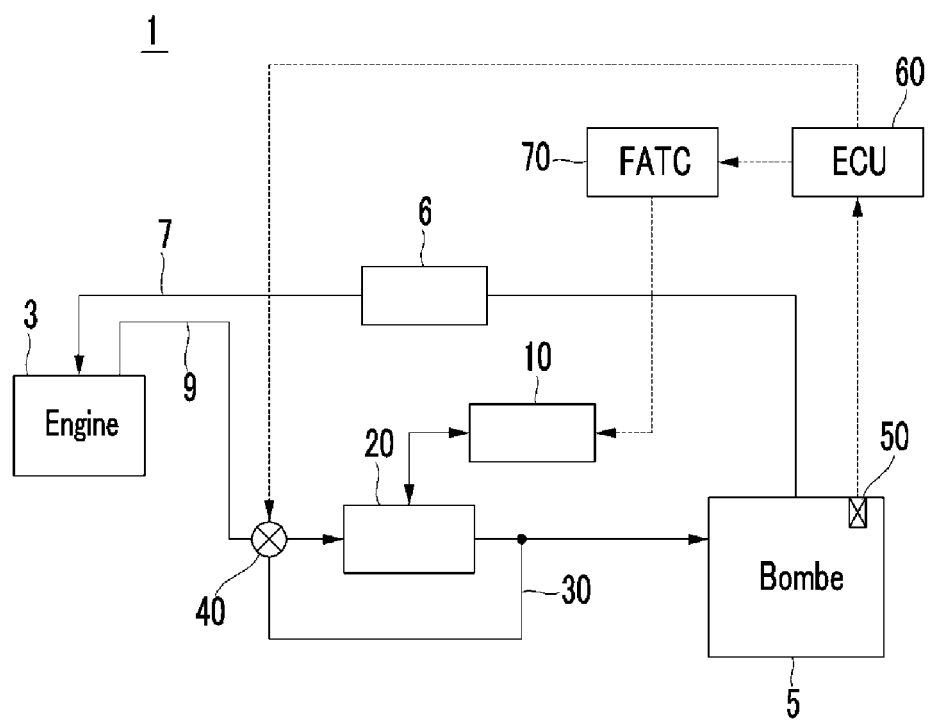
FIG. 1 is a block diagram of a return fuel cooling system for an LPI vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Prior to the description, the exemplary embodiment described in the present specification and the configuration illustrated in the drawing are simply the most exemplary embodiment, and do not represent all of the technical spirits of the present invention. Accordingly, it should be understood that there are various equivalents and modified examples capable of substituting the exemplary embodiment and the configuration at the time of filing the present application.

FIG. 1 is a block diagram of a return fuel cooling system for an LPI vehicle according to an exemplary embodiment of the present invention.

Referring to the drawing, a return fuel cooling system 1 for an LPI vehicle according to an exemplary embodiment of the present invention includes a heat exchanger 20 for heat exchanging coolant circulating an air conditioning unit 10 and LPG fuel returning from an engine 3 and a bombe 5, to have a structure capable of preventing internal pressure of bombe 5 from increasing by making the LPG fuel flow in the bombe 5 in a state where a temperature of the LPG fuel is lowered.

Further, the return fuel cooling system 1 for the LPI vehicle according to the exemplary embodiment of the present invention has a structure capable of preventing cooling performance of the air conditioning unit 10 from deteriorating by making the LPG fuel returning to the bombe 5 selectively bypass the heat exchanger according to whether an air conditioner of the vehicle is operated to prevent the LPG fuel from flowing in the heat exchanger.

To this end, the return fuel cooling system 1 for the LPI vehicle according to the exemplary embodiment of the present invention further includes, as illustrated in FIG. 1, the engine 3 and the bombe 5 which are connected to each other through a fuel supply line 7 and a fuel return line 9 in an LPI vehicle using LPG fuel, and further includes the heat exchanger 20 for cooling high-temperature LPG fuel returning from the engine 3 to the bombe 5, a bypass line 30, and a valve 40.

Further, the heat exchanger 20 is installed on the fuel return line 9, and cools the LPG fuel by heat exchanging coolant supplied and circulating from the air conditioning unit 10 in which the coolant circulates and the LPG fuel.

The heat exchanger 20 may include a plate-shaped heat exchanger in which a plurality of plates is stacked or a pipe-shaped heat exchanger having a duel pipe structure.

In the exemplary embodiment, the bypass line 30 connects the fuel return lines 9 to each other of which the heat exchanger 20 is interposed therebetween so that the LPG fuel selectively detours the heat exchanger 20 to return to the bombe 5.

That is, the bypass line 30 bypasses the LPG fuel by selectively making the LPG fuel detour the heat exchanger 20, thereby preventing the LPG fuel from flowing in the heat exchanger 20.

The valve 40 is included in the fuel return line 9 at a side of the engine 3 to be connected with the bypass line 30.

The valve 40 selectively opens/closes the fuel return line 9 connected with the heat exchanger 20 according to whether the air conditioning unit 10 is operated and a temperature of the bombe 3 to make the LPG fuel flow in the heat exchanger 20 or the LPG fuel bypass to the bypass line 30.

The air conditioning unit 10 includes a compressor, a condenser, a fan, and the like, the compressor includes an electric control valve (ECV), and the ECV controls an operation of the compressor through duty control.

A configuration and a function of the air conditioning unit are obvious to those skilled in the art, so a detailed description thereof will be omitted.

In the exemplary embodiment, the bombe 5 includes a temperature sensor 50 therein to measure a temperature of the bombe in real time.

The temperature sensor 50 measures the temperature of the bombe 5 and outputs a detection signal to the ECU 60 of the vehicle.

The ECU 60 is connected with a full automatic temperature control (FATC) 70 for controlling the air conditioning unit 10, and controls an operation of the valve 40 by determining a temperature of the bombe 5 and an operation state of the air conditioning unit 10 through signals output from the temperature sensor 50 and the FATC 70.

That is, the ECU 70 prevents a temperature of the coolant from increasing by making the LPG fuel detour to the bypass line 30 so that the LPG fuel is prevented from flowing in the heat exchanger 20 through control of the operation of the valve 40 according to the operation state of the air conditioning unit 10 output from the FATC 70, thereby preventing cooling performance of the air conditioning unit from deteriorating.

Further, when it is measured that the temperature of the bombe 5 is equal to or higher than a predetermined temperature, the ECU 60 opens the valve 40 to cool the LPG fuel returning to the bombe 5 in the heat exchanger 20, thereby preventing pressure inside the bombe from increasing.

In the meantime, a fuel filter 6 is included in the fuel supply line 7 to filter the LPG fuel supplied from the bombe 5 to the engine 3.

Hereinafter, a method of controlling the return fuel cooling system for the LPI vehicle having the aforementioned configuration will be described.

Figure 2:
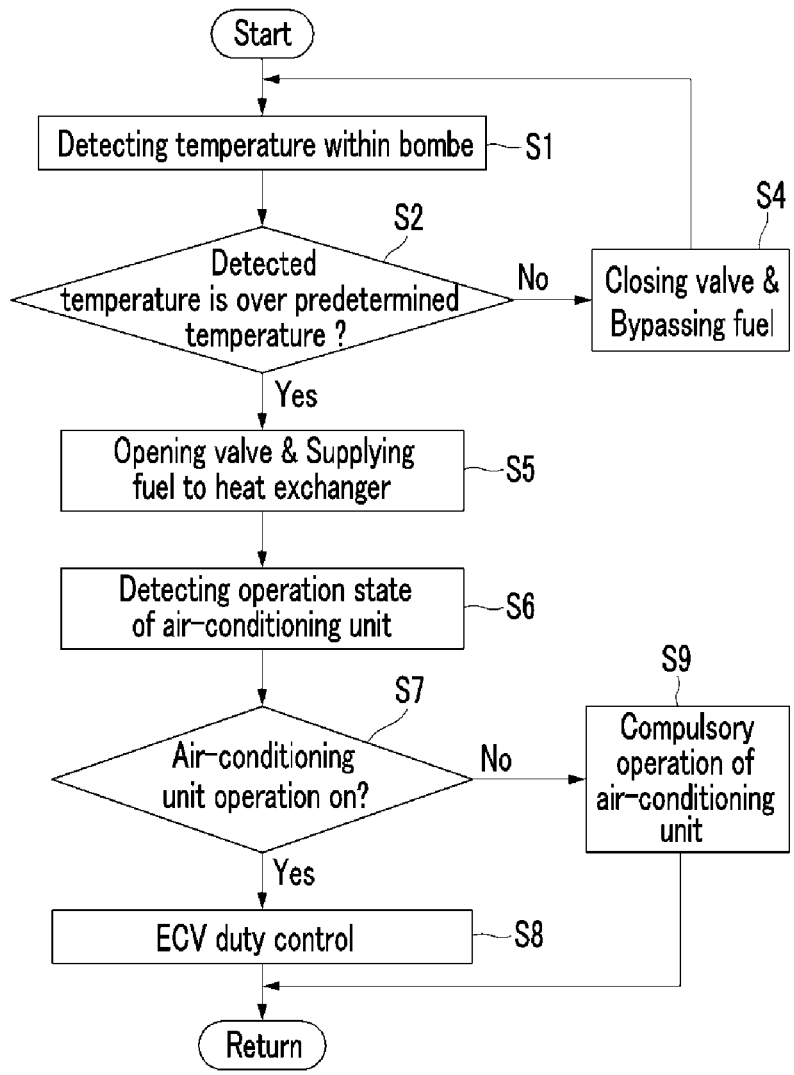
FIG. 2 is a control flowchart for describing a control method of a return fuel cooling system for an LPI vehicle according to an exemplary embodiment of the present invention.

FIG. 2 is a control flowchart for describing a method of controlling the return fuel cooling system for the LPI vehicle according to an exemplary embodiment of the present invention.

A method of controlling the return fuel cooling system for the LPI vehicle according to an exemplary embodiment of the present invention includes (a) detecting a temperature inside the bombe 5, selectively opening/closing the valve 40 included in the fuel return line 9 according to the measured temperature inside the bombe 5, and making the LPG fuel returning from the engine 3 bypass or making the LPG fuel returning from the engine 3 flow in the heat exchanger 20, (b) detecting whether the air conditioning unit 10 is operated when the LPG fuel flows in the heat exchanger 20 according to the opening of the valve 40 and determines an operation state of the air conditioning unit 10, and (c) controlling the FATC 70 according to the determined operation state of the air conditioning unit 10.

First, a temperature of the bombe 5 is detected through the temperature sensor 50 included inside the bombe 5 (S1), and it is determined whether the temperature of the bombe 5 detected through the temperature sensor 50 is equal to or higher than a predetermined temperature (S2).

When the temperature inside the bombe 5 is lower than the predetermined temperature (for example, 35° C.), the ECU 60 closes the valve 40 to make the LPG fuel returning from the engine 3 detour the bypass line 30 and make the returning LPG fuel directly flow in the bombe 5 (S4), and returns to step S1 of detecting the temperature of the bombe 5 to repeatedly perform the aforementioned steps.

In the meantime, when it is determined that the temperature inside the bombe 5 is equal to or higher than the predetermined temperature, the ECU 60 opens the valve 40, makes the LPG fuel flow in the heat exchanger 20 in which the coolant supplied from the air conditioning unit 10 flows, cools the LPG fuel through the heat exchange with the coolant, and makes the cooled LPG fuel return to the bombe 5 (S5).

Then, the ECU 60 detects an operation state of the air conditioning unit 10 through a signal output from the FATC 70, and determines whether the air conditioning unit 10 operates (S7).

However, when the air conditioning unit 10 is not operated, the ECU 60 compulsorily operates the air conditioning unit 10 to cool the LPG fuel (S9).

When the air conditioning unit 10 is operated, the ECU 60 duty controls the fan and the ECV according to the operation state of the air conditioning unit 10 (S8). For example, the duty control of the fan and the ECV may be implemented according to a map determined through an experiment, and the map may include at least one of a setting temperature selected by a driver, an exterior temperature, an interior temperature, a temperature of the coolant, cooling efficiency, and a temperature of the LPG fuel.

Accordingly, the return fuel cooling system 1 for the LPI vehicle and the method of controlling the same according to the exemplary embodiment of the present invention may prevent internal pressure of the bombe 5 from increasing by including the heat exchanger 20 for heat exchanging the coolant circulating the air conditioning unit 10 and the LPG fuel returning to the bombe 5 from the engine 3 to make the LPG fuel flow in the bombe 5 in a state where a temperature of the LPG fuel is lowered.

Further, it is possible to smoothly inject the fuel to the bombe 5 during the charging with the fuel and improve product merchantability by preventing the internal pressure of the bombe 5 from increasing.

In addition, the heat exchange is selectively performed with the air conditioning unit according to the internal temperature of the bombe 5, so that it is possible to maintain the cooling performance of the air conditioning unit.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A return fuel cooling system for a liquefied petroleum injection (LPI) vehicle having an engine and a bombe connected to each other through a fuel supply line and a fuel return line in the LPI vehicle using liquefied petroleum gas (LPG) fuel to cool high-temperature LPG fuel returning from the engine to the bombe, the return fuel cooling system comprising:

a heat exchanger mounted on the fuel return line and configured to heat exchange coolant supplied thereto and circulating from an air conditioning unit, in which the coolant circulates, with the LPG fuel to cool the LPG fuel;

a bypass line connecting upstream and downstream of the fuel return line, wherein the heat exchanger is interposed between the upstream and the downstream of the fuel return line to make the LPG fuel returning to the bombe bypass the heat exchanger and supply the LPG fuel to the bombe;

a temperature sensor; and a valve to which the fuel return line and the bypass line are connected, and selectively opening or closing the fuel return line connected with the heat exchanger according to a temperature of the bombe measured by the temperature sensor to make the LPG fuel flow in the heat exchanger or the LPG fuel flow through the bypass line, wherein the return fuel cooling system is controlled by:

detecting the temperature of the bombe through the temperature sensor included inside the bombe;

determining whether the temperature of the bombe detected through the temperature sensor is equal to or hi her than a predetermined temperature;

when the temperature of the bombe is lower than the predetermined temperature, closing the valve and making the LPG fuel returning from the engine detour to the bypass line to make the returning LPG fuel directly flow in the bombe; and when the temperature of the bombe is determined to be equal to or higher than the predetermined temperature, opening the valve, making the LPG fuel flow in the heat exchanger in which the coolant supplied from the air conditioning unit flow, and cooling the LPG fuel with the coolant through heat exchange to make the cooled LPG fuel return to the bombe, and detecting whether the air conditioning unit is operated and determining an operation state of the air conditioning unit when the LPG fuel flows in the heat exchanger according to opening of the valve; and controlling the air conditioning unit according to the operation state of the air conditioning unit and compulsorily driving the air conditioning unit to cool the LPG fuel when the air conditioning unit is not operated.

2. The return fuel cooling system of claim 1, wherein the bombe includes the temperature sensor therein, and wherein the temperature sensor measures the temperature in the bombe and outputs a detected signal to an electronic control unit (ECU) of the vehicle.

3. The return fuel cooling system of claim 2, wherein the ECU is connected with a full automatic temperature control (FATC) configured to control the air conditioning unit, and controls an operation of the valve according to the temperature in the bombe and the operation state of the air conditioning unit through signals output from the temperature sensor and the FATC.

* * * * *